United States Patent Office 3,586,522
Patented June 22, 1971

3,586,522
GLASS-CERAMICS CONTAINING $BaAl_2Si_2O_8$
CRYSTALLINE PHASE
Lewis C. Hoffman, Wilmington, Del., assignor to E. I. du Pont de Nemours and Company, Wilmington, Del.
No Drawing. Continuation-in-part of abandoned application Ser. No. 646,414, June 1, 1967. This application Mar. 29, 1968, Ser. No. 717,410
Int. Cl. C03c 3/22
U.S. Cl. 106—39    4 Claims

ABSTRACT OF THE DISCLOSURE

Novel glass-ceramics which consist essentially of critical proportionate amounts of $SiO_2$, PbO, $Al_2O_3$, $TiO_2$ and BaO; optional components include: ZnO, $PbF_2$, SrO, $ZrO_2$, $Ta_2O_5$, $WO_3$, CdO, $SnO_2$ and $Sb_2O_3$. These glass-ceramics are usable, e.g., in particulate form, in preparing screen printable crossover dielectric compositions, and as the inorganic binder component in preparing screen printable conductor compositions and resistor compositions.

CROSS-REFERENCES TO RELATED APPLICATIONS

This is a continuation-in-part of S.N. 646,414, filed June 1, 1967, now abandoned.

BACKGROUND OF THE INVENTION

A glass-ceramic is defined as a polycrystalline ceramic prepared by the controlled crystallization of a glass in situ. This controlled crystallization usually contemplates the addition of a nucleating or crystallization-promoting agent to a glass-forming batch, melting the batch, simultaneously shaping and cooling the melt into a glass body, and thereafter heat treating the resultant shape following a critical time-temperature schedule. This heat treatment causes the glass shape to be converted into a body composed of fine-grained crystals randomly oriented and dispersed substantially uniformly throughout a glassy matrix with the crystals comprising a major portion of the body. The crystalline makeup of the body usually results in physical properties differing considerably from those of the original glass. However, because it is originally a glass, the body can be formed into almost any configuration using conventional methods of shaping glass. Ceramic materials have wide-spread application in the electrical industry as dielectric bodies. It is well established in the art that the electrical properties of the ceramic body depend on the chemical composition and the grain structure of the body. There is considerable literature in the art dealing with the addition of minor amounts of various chemical ingredients to the ceramic particles from which a ceramic dielectric body is prepared (by sintering) for the purpose of improving electrical properties of the body, such as dielectric constants, temperature dependence of the dielectric constant, leakage control, power factor, and stability of electric properties with time at various temperatures and electric load conditions.

A crossover dielectric composition is essentially a low dielectric constant insulator capable of separating two conductor patterns through several firing steps. In the past, high melting, viscous glasses have been used as the dielectric so that the firing of the top conductor line can be carried out at a temperature below that at which softening of the dielectric occurs. Melting or softening of the crossover dielectric is accompanied by shortening of the two conductor patterns against each other with subsequent failure of the electrical circuit. The major requirement for a crossover dielectric is control of resoftening or thermoplasticity in the top conductor firing step. Other property requirements are: (a) low dielectric constant to prevent A.C. capacitance coupling between insulated circuits, (b) low electric loss (high Q-value) to avoid dielectric heating, (c) low "pinholing" tendency and a low tendency to evolve gases in firing, (d) proper glass-ceramic precursor softening temperature so that the initial firing is adaptable to the screen printing process, (e) a high resistance to thermal shock crazing, and (f) low sensitivity to water vapor and subsequent spurious electrical losses.

Therefore, there is a continuing need for better glass-ceramics which can be used in dielectric compositions, resistor compositions, conductor compositions and generally wherever glasses are used in the manufacture of electrical circuits and components thereof.

SUMMARY OF THE INVENTION

This invention relates to novel glass-ceramic precursors which are glasses of a composition consisting essentially of:

| | Percent by weight |
|---|---|
| $SiO_2$ | 20–38 |
| PbO | 21–45 |
| $Al_2O_3$ | 1–25 |
| $TiO_2$ | 2–20 |
| BaO | 2–15 |
| ZnO | 0–25 |
| $PbF_2$ | 0–15 |
| SrO | 0–5 |
| $ZrO_2$ | 0–5 |
| $Ta_2O_5$ | 0–5 |
| $WO_3$ | 0–5 |
| CdO | 0–5 |
| $SnO_2$ | 0–5 |
| $Sb_2O_3$ | 0–5 |

Novel glass ceramics are produced by firing the above precursor glasses to form a product containing less than 50% by weight of a crystalline phase. Screen printable dielectric compositions of this invention comprises a dispersion of the above glass-ceramic precursors (in finely divided form) in an inert vehicle wherein the amount of vehicle preferably does not exceed 60% by weight of the dielectric composition. The metallizing compositions of this invention (including resistor compositions and conductor compositions) comprise a finely divided powder of the above glass-ceramic precursors, finely divided noble metal powder(s), and an inert vehicle.

A physical mixture of the metal oxides forms stable glasses when quenched from the molten state to produce the glass-ceramic precursors. When the glasses are finely ground, dispersed in an inert vehicle, printed and fired as films on substrates, the nucleation and crystallization of the glass to form a glass-ceramic are carried out in a single step, at the same firing temperature and, consequently, much more rapidly than the conventional crystallizing glasses. Once the instant glass-ceramic precursor softens and is held at the firing temperature for a sufficient period of time to crystallize, it becomes a non-thermoplastic ceramic. These glass-ceramics are particularly useful as crossover dielectrics since they do not soften and do not cause short circuiting.

DESCRIPTION OF THE PREFERRED EMBODIMENTS

The particular glass-ceramics of this invention exploit various ingredients in a critical combination of proportions such that the compositions possess highly desirable properties in the electrical industry. More particularly, these ingredients must be present within the composition ranges of weight percentages defined below in Table I.

TABLE I

|  | Weight percent | |
|---|---|---|
|  | Operable proportions | Preferred proportions |
| $SiO_2$ | 20–38 | 22–32 |
| PbO | 21–45 | 22–42 |
| $Al_2O_3$ | 1–25 | 9–13 |
| $TiO_2$ | 2–20 | 3–15 |
| BaO | 2–15 | 4–12 |
| ZnO | 0–25 | 0–20 |
| $PbF_2$ | 0–15 | 0–10 |
| SrO | 0–5 | 0–4 |
| $ZrO_2$ | 0–5 | 0–4 |
| $Ta_2O_5$ | 0–5 | 0–4 |
| $WO_3$ | 0–5 | 0–4 |
| CdO | 0–5 | 0–4 |
| $SnO_2$ | 0–5 | 0–4 |
| $Sb_2O_3$ | 0–5 | 0–4 |

The previously mentioned requirements for a glass-ceramic are satisfied by the glass-ceramic compositions described in Table I. The glass-ceramics are basically in the system $BaO-PbO-Al_2O_3-TiO_2-SiO_2$, although some of the PbO can be replaced by ZnO, some of the BaO by SrO, and small amounts of other common glass constituents which do not adversely affect the desirable glass-ceramic properties, may be present.

The glass-ceramic contains a crystalline phase comprising less than 50% by weight of the glass-ceramic; the preferred crystallinity is less than 40% by weight. The crystals formed on firing are the molar compositions $BaAl_2Si_2O_8$ and $Al_2TiO_5$. The major crystalline phase, $BaAl_2Si_2O_8$ (hexacelsian), has been identified by X-ray diffraction pattern and is a feldspar of cubic symmetry. $AlTiO_5$ may also be present in small amounts. BaO may be partially replaced by SrO in the $BaAl_2Si_2O_8$ crystal and the Si:Al ratio is variable with the charge compensation obtained from hydroxyl ion substitution for oxygen. For this reason, BaO $Al_2O_3$ and $SiO_2$ are three of the essential ingredients in the glass precursor composition. $TiO_2$ is the nucleating agent and the amount utilized greatly controls the crystalline content of the fired glass-ceramic. Therefore, the $TiO_2$ and amount used is not only essential but critical to the present invention. PbO is essential as a flux but is the only flux present; there are no alkalies or $B_2O_3$ in the composition since alkalies harm electrical properties and $B_2O_3$ is deleterious to crystallinity.

The glass-ceramic must contain at least 2% by weight of $TiO_2$ since amounts less than this do not cause sufficient crystallization to produce useful glass-ceramics. At a concentration of 3%, the degree of crystallinity is substantial and the fired glass-ceramics still have a semi-glossy appearance. As the amount of $TiO_2$ is increased mattness increases and, consequently, $TiO_2$ contents of 10–12% produce coherent fired glass-ceramics having little, if any, surface gloss at all. More than 20% $TiO_2$ is harmful because the resulting glass-ceramics are too crystalline. High crystallinity (e.g., 50% by weight or more) is not desirable for electronic applications since highly crystalline glass-ceramics do not exhibit dense, pore-free glass-ceramic layers on ceramic substrates. Glass-ceramics having at least 20% by weight crystallinity but less than 40% by weight crystallinity are most desirable and preferred for the conventional electronic uses. Therefore, since $TiO_2$ greatly controls the degree of crystallinity, the proportions of $TiO_2$ must be within the range of 2–20%, and preferably 3–15% by weight of the glass-ceramic.

The amount of $SiO_2$ utilized must be at least 20% by weight of the glass-ceramic since when less than 20% $SiO_2$ is utilized, fluid melts which do not maintain their shape and position as printed crossover dielectrics are produced. The use of more than 38% $SiO_2$ produces glass-ceramic precursors which do not meet the firing temperature requirements of conventional screen printing processes, i.e., the precursor glasses are too high melting.

$Al_2O_3$ must be present in amounts ranging from 1% by weight of the glass-ceramic. Less than 1% $Al_2O_3$ causes a failure of crystallization; the present crystallinity of the fired glass-ceramic reaches a maximum at about 10% $Al_2O_3$. Larger amounts actually yield lower crystallinity; and when $Al_2O_3$ is above about 25%, the glass-ceramic becomes too refractory. Due to its critical role in the crystalline hexacelsian phase, BaO must comprise at least 2% by weight of the glass-ceramic. The use of more than 15% gives excessive porosity because of its high melting point.

PbO is present as flux and is the only flux present in the glass-ceramic system; the purpose of the flux is to lower the melting point and viscosity. When less than 21% by weight is present in the glass-ceramics, the firing temperature is too high. When above 45% is present, the firing temperature is too low, the fluidity is too high and the glass-ceramic becomes yellow in color. ZnO can be used to replace some of the PbO. The zinc oxide is preferred to be present in amounts which comprise up to 25% of the glass-ceramic. It has been found that 25% ZnO is the most that the glass-ceramic system will tolerate in that amounts greater than this give poor firing and high porosity.

SrO, $ZrO_2$, $Ta_2O_5$, $WO_3$, $CdCO$, $SnO_2$, $Sb_2O_2$, $Sb_2O_3$ and $PbF_2$ have been found to be introducible without strong deleterious effects. In addition, MgO inhibits crystallization; $Nb_2O_5$ produces yellow products; $MoO_2$ is partially reduced, causes the color to turn black, and produces undesirably low electrical resistances in the glass-ceramic. Except for SrO, no great benefits are seen from the addition of any of the normal glass constituents commonly used in the industry. However, the only common glass constituents which can be included are those constituents which do not adversely affect the properties of the glass-ceramic.

The glass-ceramics of this invention are produced by melting any suitable batch composition yielding the prescribed metallic oxides and proportions thereof. In Table II there are listed several batch compositions which, when melted, will result in glass-ceramic precursors falling within the prescribed weight percentage ranges of this invention. In practicing the invention, the batch composition to be utilized is first prepared and then melted to yield a substantially homogeneous fluid glass. The temperature maintained during melting is not critical but is usually within the range of 1100–1500° C. in order that rapid homogenization of the melt may be obtained. A temperature of about 1450° C. is preferred.

TABLE II.—BATCH COMPOSITIONS, WEIGHT PERCENT

| | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
|---|---|---|---|---|---|---|---|---|---|---|---|---|---|---|---|---|---|---|---|---|---|---|
| $SiO_2$, flint | 27.8 | 25.0 | 22.2 | 30.5 | 33.1 | 34.3 | 26.5 | 27.4 | 27.8 | 27.8 | 31.8 | 27.5 | 27.8 | 27.8 | 27.4 | 24.1 | 27.8 | 27.8 | 28.1 | 27.8 | 27.8 | 27.7 |
| $Al(OH)_3$, aluminum hydrate | 15.5 | 15.5 | 15.5 | 15.5 | 15.8 | 7.3 | 27.1 | 19.5 | 15.5 | 15.5 | 15.7 | 15.4 | 15.5 | 15.5 | 15.8 | 15.8 | 15.5 | 15.5 | 15.7 | 15.5 | 15.5 | 15.5 |
| $TiO_2$, titania | 8.3 | 11.1 | 13.9 | 5.6 | 2.8 | 8.6 | 10.4 | 8.2 | 8.3 | 8.3 | 8.4 | 8.4 | 8.3 | 8.3 | 8.2 | 8.3 | 8.3 | 8.3 | 8.9 | 8.3 | 8.3 | 8.3 |
| PbO, litharge | 29.6 | 29.6 | 29.6 | 29.6 | 29.6 | 30.5 | 20.5 | 26.4 | 38.9 | 34.5 | 29.9 | 25.6 | 25.0 | 20.4 | 29.7 | 29.3 | 29.6 | 29.6 | 29.4 | 29.6 | 29.6 | 20.4 |
| $BaCO_3$, barium carbonate | 9.5 | 9.5 | 9.5 | 9.5 | 9.5 | 9.5 | 9.5 | 9.4 | 9.5 | 6.4 | 4.9 | 14.1 | 13.9 | 18.5 | 4.1 | 9.3 | 9.5 | 9.5 | 4.9 | 9.5 | 9.5 | 9.5 |
| ZnO, zinc oxide | 9.3 | 9.3 | 9.3 | 9.3 | 9.3 | 9.3 | 9.3 | 9.1 | 9.3 | 9.3 | 9.3 | 9.3 | 9.3 | 9.3 | 6.1 | 9.3 | 9.3 | 9.3 | 9.3 | 9.3 | 9.3 | 9.3 |
| $SrCO_3$, strontium carbonate | 0 | 0 | 0 | 0 | 0 | 0 | 0 | 0 | 0 | 0 | 0 | 0 | 0 | 0 | 0 | 0 | 0 | 0 | 0 | 0 | 0 | 8.3 |
| $ZrO_2$, opax | 0 | 0 | 0 | 0 | 0 | 0 | 0 | 0 | 0 | 0 | 0 | 0 | 0 | 0 | 0 | 3.7 | 3.7 | 3.7 | 3.7 | 3.7 | 3.7 | 0 |
| $Ta_2O_5$, tantalum pentoxide | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| $WO_3$, tungstic anhydride | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| CdO, cadmium oxide | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| $SnO_2$, tin oxide | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| $Sb_2O_3$, antimony oxide | 0 | 0 | 0 | 0 | 0 | 0 | 0 | 0 | 0 | 0 | 0 | 0 | 0 | 0 | 0 | 0 | 0 | 0 | 0 | 3.7 | 3.7 | 0 |
| $PbF_2$, lead fluoride | 0 | 0 | 0 | 0 | 0 | 0 | 0 | 0 | 0 | 0 | 0 | 0 | 0 | 0 | 0 | 0 | 0 | 0 | 0 | 0 | 0 | 9.3 |

After a homogeneous fluid glass is secured, it is further processed or fabricated by any procedure well known in the art. It may, for example, be drawn or blown or pressed into the form of desired objects. Generally, the homogeneous glass fluid will be poured into water or other liquid to form a frit which may then be subsequently ground or comminuted to a powder. This glass product is the glass-ceramic precursor of this invention. To produce the glass-ceramic product of this invention, the precursor is fired at 800–900° C.; this firing step is a very important process step of this invention. The glass-ceramic precursor, which is a glass resulting from melting the batch composition and quenching the melt, is fired, preferably at a temperature where differential thermal analysis (DTA) shows the maximum crystallization rate. Conventional differential thermal analysis procedures and determinations are disclosed by Smothers, W. J., "Differential Thermal Analysis," Chemical Publishing Company, New York (1958). It is important that the nucleation and crystallization are carried out in a single step, at the same firing temperature to form a glass-ceramic within a short period of time (e.g., one minute). As the firing is carried out, crystals form and grow until the glass-ceramic film is opaque. By following this procedure, the glass-ceramic products of this invention contain less than 50% of the crystalline phase with the remainder being the remanent glass phase.

In practicing the invention, batch mixtures given in Table II, or any other suitable batch compositions, may be employed in producing the glasses of the compositions of Table III which may then be utilized to produce screen printable crossover dielectrics, capacitor dielectrics, resistor compositions and/or conductor compositions. These dielectric and metalizing compositions (e.g., resistor and conductor compositions) may vary in nature according to the particular croice of ingredients and may be characterized in properties such as fluidity, softening point, stability against devitrification and similar properties. It is possible to depart somewhat from the specific examples tabulated provided that compositions having the constituents present within the weight percentages given are utilized.

The invention is illustrated by the following examples. In the examples and elsewhere in the specification, all parts, ratios and percentages of materials or components are by weight.

Various glass-ceramic precursor glass compositions (Examples 1–22) of Table III were prepared in frit form from the respective batch compositions (1–22) of Table II. The dry batch components were weighed out, thoroughly mixed and introduced into a kyanite crucible. The crucible and contents were placed in an electric furnace at 1450° C. and held at that temperature until all gas evolution ceased and the contents were clear and transparent. The crucible and contents were removed from the furnace and the contents slowly poured into cold water. The high viscosity of the glass-ceramic precursor is advantageous in this pouring step. The frit formed by this process was placed in a ball mill jar, equipped with the normal complement (half full) grinding medium (ceramic balls) and the proper weight of water, and ground until less than 1% residue was retained on a 325 mesh sieve. Normally, it takes 16 hours for a 1,500 gram charge in a one-gallon ball mill with 120 ml. of water to be properly ground. The screened slurry was filtered off on No. 1 Whatman paper and dried at 105° C. for 16 hours. The dried cake was micropulverized to break up the drying aggregates. These finely divided glass-ceramic precursor powders were ready for any desired applications.

TABLE III.—MELTED COMPOSITIONS, WEIGHT PERCENT

| | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
|---|---|---|---|---|---|---|---|---|---|---|---|---|---|---|---|---|---|---|---|---|---|---|
| $SiO_2$ | 30 | 27 | 24 | 33 | 36 | 36 | 30 | 30 | 30 | 30 | 34 | 30 | 30 | 30 | 30 | 26 | 30 | 30 | 30 | 30 | 30 | 30 |
| $Al_2O_3$ | 11 | 11 | 11 | 11 | 11 | 5 | 20 | 14 | 11 | 11 | 11 | 11 | 11 | 11 | 11 | 11 | 11 | 11 | 11 | 11 | 11 | 11 |
| $TiO_2$ | 9 | 12 | 15 | 6 | 3 | 9 | 9 | 9 | 9 | 9 | 9 | 9 | 9 | 9 | 9 | 9 | 5 | 5 | 9 | 5 | 5 | 9 |
| $PbO$ | 32 | 32 | 32 | 32 | 32 | 32 | 23 | 29 | 42 | 37 | 32 | 28 | 27 | 22 | 32 | 32 | 32 | 32 | 32 | 32 | 32 | 32 |
| $BaO$ | 8 | 8 | 8 | 8 | 8 | 8 | 8 | 8 | 8 | 8 | 4 | 12 | 8 | 8 | 4 | 8 | 8 | 8 | 4 | 8 | 8 | 8 |
| $ZnO$ | 10 | 10 | 10 | 10 | 10 | 10 | 10 | 10 | 0 | 5 | 10 | 10 | 15 | 20 | 10 | 10 | 10 | 10 | 10 | 10 | 10 | 10 |
| $SrO$ | 0 | 0 | 0 | 0 | 0 | 0 | 0 | 0 | 0 | 0 | 0 | 0 | 0 | 0 | 4 | 0 | 0 | 0 | 0 | 0 | 0 | 0 |
| $ZrO_2$ | 0 | 0 | 0 | 0 | 0 | 0 | 0 | 0 | 0 | 0 | 0 | 0 | 0 | 0 | 0 | 4 | 0 | 0 | 0 | 0 | 0 | 0 |
| $Ta_2O_5$ | 0 | 0 | 0 | 0 | 0 | 0 | 0 | 0 | 0 | 0 | 0 | 0 | 0 | 0 | 0 | 0 | 4 | 0 | 0 | 0 | 0 | 0 |
| $WO_3$ | 0 | 0 | 0 | 0 | 0 | 0 | 0 | 0 | 0 | 0 | 0 | 0 | 0 | 0 | 0 | 0 | 0 | 4 | 0 | 0 | 0 | 0 |
| $CdO$ | 0 | 0 | 0 | 0 | 0 | 0 | 0 | 0 | 0 | 0 | 0 | 0 | 0 | 0 | 0 | 0 | 0 | 0 | 4 | 0 | 0 | 0 |
| $SnO_2$ | 0 | 0 | 0 | 0 | 0 | 0 | 0 | 0 | 0 | 0 | 0 | 0 | 0 | 0 | 0 | 0 | 0 | 0 | 0 | 4 | 0 | 0 |
| $Sb_2O_3$ | 0 | 0 | 0 | 0 | 0 | 0 | 0 | 0 | 0 | 0 | 0 | 0 | 0 | 0 | 0 | 0 | 0 | 0 | 0 | 0 | 4 | 0 |
| $PbF_2$ | 0 | 0 | 0 | 0 | 0 | 0 | 0 | 0 | 0 | 0 | 0 | 0 | 0 | 0 | 0 | 0 | 0 | 0 | 0 | 0 | 0 | 10 |

These glass compositions of Table III are particularly useful as screen-printable crossover dielectrics. This is demonstrated by the following examples.

EXAMPLES 23–44

The fine glass-ceramic precursor powders (prepared in Examples 1–22 and corresponding, respectively, to Examples 23–44) were dispersed in an inert vehicle consisting of 8% ethyl cellulose and 92% beta-terpineol. The resulting paste was ready for printing and had a Brookfield viscosity of 600 poise at 10 revolutions per minute.

In a separate step, a 96% alumina ceramic substrate was provided with a screen printed conductive plane of platinum-gold conductor composition. The platinum-gold conductor composition, which was in finely divided form (0.1–20 microns), consisted of:

| | Percent by weight |
|---|---|
| Gold | 55 |
| Platinum | 15 |
| $Bi_2O_3$ | 12 |
| Inert vehicle (8% ethyl cellulose/92% beta-terpineol) | 15 |
| Glass (63.1% CdO, 16.9% $B_2O_3$, 12.7% $SiO_2$, 7.3% $Na_2O$) | 3 |

This bottom conductive plane was fired at 1050° C. for two minutes. This temperature is not critical but is generally made as high as the metal phase in the conductor will tolerate in order to provide good adhesion.

These preprinted substrates were covered with a crossover dielectric print utilizing the previously prepared dispersions from the compositions of Table III, in the desired configuration consisting of a complete cover, with edges included except for a land area at one corner for connection to the ground plane. The prints were made through a 105 mesh screen stencil in order to give a fairly thick fired layer of glass-ceramic crossover. The firing temperature and time were at about 850° C. for 10 minutes with about 5 minutes at peak temperature.

A top platinum-gold conductor layer was printed over the glass-ceramic to conform to the configuration of the glass-ceramic dielectric layer. The top conductor firing was carried at 750° C. for 10 minutes. In every situation the top conductor lines were printed and fired without the crossover softening, and therefore, there was no short circuiting.

The crystalline phases of the crossover dielectrics were identified by X-ray diffraction and confirmed by experimental synthesis of the feldspar, $Ba(Al_2Si_2)O_8$. Small amounts of $Al_2TiO_5$ were also present. Cu K-alpha radiation with a nickel filter and powder patterns were used in this identification.

A 30 power stereo microscope was used to examine the fired crossover dielectrics with normal and incident radiation before and after a thermal shock test of five cycles from boiling water to ice water and back again. All of the glass-ceramics resulting from glasses of the compositions in Table III passed this severe test without crazing.

The glass-ceramic of Example 23 was fully characterized. It had a dielectric constant of 13.9 at 1 kHz. and a dissipation factor of 0.05%. It had a Q of 580 at 1 mHz. and 100 at 5 mHz. Its D.C. resistance as a cross-over in a capacitor configuration was above $10^9$ ohms when the capacitance varied from 7–265 picofarads. Its A.C. dielectric withstanding voltage was greater than 250 volts per mil on a capacitor of 125 picofarads. After 150 hours at 95% relative humidity and 85° C., its dissipation factor rose to 7.32%, but its insulation resistance was still above $10^9$ ohms. The resistance of the platinum-gold conductor over the crossover was 58 milliohms/square vs. 72 milliohms/square on the substrate; the resistance of a silver conductor is 4.8 milliohms/square vs. 4.3 milliohms on the substrate. The soldered resistance of platinum-gold is 10.9 milliohms/square vs. 14.5 milliohms on the substrate while the soldered resistance of silver is 7.3 milliohms/square vs. 3.3 milliohms on the substrate.

Dielectric properties were measured with a General Radio Type 1615–A capacitance bridge at 1 kHz.; a Boonton Radio Model 260–A Q meter was used at 1 mHz. D.C. high resistances were measured with a Mid-eastern Megatrometer Model 710 and the relatively low resistances were measured with a Keithley model 50–A milliohmeter.

As to the glass-ceramics of Examples 24–44, their I.R.'s were measured and were between $10^5$ and $10^{11}$ ohms. Dielectric withstanding voltage was always above 200 volts per mil (A.C.).

The glass-ceramics of this invention can also be used as the dielectric in capacitors; this is illustrated by the following example.

EXAMPLE 45

The finely divided glass-ceramic powder of Example 6 was dispersed in an inert vehicle consisting of 8% ethyl cellulose and 92% beta-terpineol to produce a dielectric composition. This composition was then used in fabricating an electrical capacitor in a conventional manner, such as is disclosed in U.S. Pat. 2,398,176.

The capacitor was prepared by firing a 3.1 mm. square electrode print of a platinum-gold metalizing composition (which is described in Examples 23–44) on a 96% alumina substrate at 750° C. for 10 minutes. The prefired bottom electrode was then covered with a print of the above-mentioned glass-ceramic composition of Example 6 in an organic vehicle, and then dried. Finally, a third print of the same metalizing composition (counterelectrode) was superimposed on the dielectric print and the assemblage of prints was coalesced (fired) at 750° C. for 10 minutes to form a fired capacitor.

The capacitor produced, when the glass-ceramic composition of this invention was used as the dielectric of the capacitor, was found to possess an outstanding combination of electrical properties. In addition to having desirable Q-values, the capacitor had a low dielectric constant, low dielectric loss and possessed a small capacitance change per temperature change.

The glass-ceramics of this invention have a wide variety of other uses. For example, the glass-ceramic offers advantages as an inorganic binder for conductor compositions. When so used, the very high mechanical strength of the glass-ceramic results in printed and fired conductors having high adhesion since the strength of the inorganic binder is important in this application. This is demonstrated by the followng example.

EXAMPLE 46

A conductor composition was screen printed onto a 96% alumina ceramic substrate. The conductor composition, which was in finely divided form (0.1–20 microns), consisted of:

| | Percent by weight |
|---|---|
| Gold | 55 |
| Platinum | 15 |
| Inert vehicle (8% ethyl cellulose/92% beta - ter pineol) | 15 |
| Glass-ceramic precursor of Example 4 | 15 |

The printed and fired conductor exhibited good conductivity, excellent adhesion and good solderability.

The glass-ceramics of this invention also offer an important advantage in resistor compositions where the conversion of the fluid glass to ceramic arrests the sintering of the precious metal powders and yields very low change of resistance with firing time.

The glass-ceramics of this invention also have utility in the encapsulation of electronic circuit components and in the production of hermetic seals where the novel glass-ceramics can be used in place of conventional glasses which are now used in the field of encapsulation and hermetically sealing electronic components. The following example demonstrates the production of hermetically sealed electronic components with the novel glass-ceramics of this invention.

EXAMPLE 47

The glass-ceramic precursor powder of Example 1 was dispersed in an inert vehicle consisting of 30% Staybelite (hydrogenated rosin), 48% kerosene, 16% aromatic naphtha and 6% ethyl cellulose; the solids:liquids ratio was 70:30. The dispersion was screen printed onto a 96% alumina ceramic substrate and dried for 10 minutes at 100–110° C. A metalizing composition was screen printed in an electrode pattern over the dried glass-ceramic precursor. The metalizing composition, which was in finely divided form (0.1–20 microns), consisted of:

| | Percent |
|---|---|
| Platinum | 76 |
| Palladium | 4 |
| Inert vehicle (described above) | 20 |

This printed composition was dried for 10 minutes at 100–110° C. Now in separate steps, two ring patterns of the glass-ceramic precursor dispersion (described above) were screen printed over the electrode pattern and dried. Then a top layer of the same metalizing composition was screen printed, in a ring pattern, over the two layers of the dried glass-ceramic precursor. This metallization layer was dried and the entire printed substrate was fired in a lehr at a peak temperature of 1000° C. for 2 minutes. Finally, a metal cap was soldered to the top metalization layer with a solder consisting of 62% tin, 36% lead and 2% silver. The metal cap, 0.35 inch in diameter and 0.25 inch high, was an alloy of 54% iron, 29% nickel and 17% cobalt.

This printed substrate having the metal cap thereover was tested for hermeticity using the Consolidated Electronics Corporation Helium Leak Detector. A good hermetic seal was found to have been formed between the top metalization layer and the metal cap. The use of the present glass-ceramic permitted the one-step firing of the printed substrate without causing short circuiting. This is opposed to the use of conventional glasses which must be fired in separate steps from the metalization layers firing in order to prevent short circuiting.

In preparing the crossover dielectric compositions, the capacitor dielectric compositions, the resistor compositions or the conductor compositions, any inert liquid may be utilized as the vehicle. Water or any one of various organic liquids, with or without thickening and/or stabilizing agents and/or other common additives, may be used. Examples of organic liquid that can be used are the aliphatic alcohols; esters of such alcohols, for example, the acetate and propionates; the terpenes such as pine oil, alpha- and beta-terpineol and the like; solutions of resins such as the polymethacrylates of lower alcohols, or solutions of ethyl cellulose, in solvents such as pine oil and the monobutyl ether of ethylene glycol monoacetate. The vehicle may contain or be composed of volatile liquids to promote fast-setting after application; or it may contain waxes, thermoplastic resins or the like materials which are thermofluids so that the vehicle-containing composition may be applied at an elevated temperature to a relatively cold ceramic body upon which the composition sets immediately.

The proportions of inert vehicle:solids (glass, metals, etc.) in the dielectric compositions and metalizing compositions of this invention may vary considerably depending upon the manner in which the paint or paste is to be applied and the kind of vehicle used. Generally, from 1–20 parts by weight of solids (glass, metals, etc.) per part by weight of vehicle will be used to produce a paint or paste of the desired consistency. Preferably, 4–10 parts of solids per part of vehicle will be used.

A wide variety of metals can be used in the electrode layers of the capacitors, the resistor compositions and conductor compositions of this invention. While not intending to limit the scope of this invention, the preferred metals are noble metals and particularly gold, silver, platinum, palladium, rhodium, iridium, alloys, oxides and mixtures thereof. Any of the other metals which are employed in metalizing compositions can also be used; for example, molybdenum, tungsten, iron, nickel, copper, chromium, zirconium, thorium, oxides, alloys and mixtures thereof are applicable.

The metalizing compositions of this invention include conductor compositions and resistor compositions depending upon the metal content and are generally the type described in the art; for example, see Short U.S. Pat. 2,819,170, Larsen et al. U.S. Pat. 2,822,279, D'Andrea U.S. Pat. 2,924,540, Dumesnil U.S. Pat 3,052,573 and Hoffman U.S. Pat. 3,232,886. The metalizing compositions generally comprise 4–99% by weight of a noble metal powder and 1–96% by weight of a glass-ceramic precursor. For purposes of this invention, the glass utilized is the previously described glass-ceramic composition.

The noble metal and glass-ceramic components should be in finely divided form. Noble metal powders having an average particle size not exceeding 40 microns are generally suitable and those having average particle sizes ranging from 0.01–10 microns are preferred. The glass-ceramic precursor powders having an average particle size not exceeding 50 microns in diameter are generally suitable but those having average particle sizes of 1–15 microns are distinctly preferred.

It is pointed out that generally, the glass-ceramic precursors of this invention may be used to replace any of the conventional inorganic binder materials which are commonly employed to bind metals to substrates. Conventional inorganic binders are disclosed in patents, for example, to Larsen and Short, U.S. Pat. No. 2,822,279 and to Hoffman, U.S. Pat. No. 3,207,706.

Since it is obvious that many changes and modifications can be made in the above-described details without departing from the nature and spirit of the invention, it is to be understood that the invention is not to be limited to said details except as set forth in the appended claims.

What is claimed is:

1. A glass-ceramic consisting essentially of a fired glass composition, said glass composition consisting essentially of:

| | Percent by weight |
|---|---|
| $SiO_2$ | 20–38 |
| PbO | 21–45 |
| $Al_2O_3$ | 1–25 |
| $TiO_2$ | 2–20 |
| BaO | 2–15 |
| ZnO | 0–25 |
| $PbF_2$ | 0–15 |
| $SrO_2$ | 0–5 |
| $ZrO_2$ | 0–5 |
| $Ta_2O_5$ | 0–5 |
| $WO_3$ | 0–5 |
| CdO | 0–5 |
| $SnO_2$ | 0–5 |
| $Sb_2O_3$ | 0–5 | and said glass-ceramic containing a total crystalline phase which is from about 20% to about 40% by weight of the glass-ceramic, the crystalline phase being a feldspar of cubic symmetry with the formula $BaAl_2Si_2O_8$.

2. The glass-ceramic of claim 1 which further has small amounts of $Al_2TiO_5$ in the crystalline phase.

3. A glass-ceramic consisting essentially of a fired glass composition, said glass composition consisting essentially of:

| | Percent by weight |
|---|---|
| $SiO_2$ | 22–32 |
| PbO | 22–42 |
| $Al_2O_3$ | 9–13 |
| $TiO_2$ | 3–15 |
| BaO | 4–12 |
| ZnO | 0–20 |
| $PbF_2$ | 0–10 |
| SrO | 0–4 |
| ZrO | 0–4 |
| $Ta_2O_5$ | 0–4 |
| $WO_3$ | 0–4 |
| CdO | 0–4 |
| $SnO_2$ | 0–4 |
| $Sb_2O_3$ | 0–4 | and said glass-ceramic containing a total crystalline phase which is from about 20% to about 40% by weight of the glass-ceramic, the crystalline phase being a feldspar of cubic symmetry with the formula $BaAl_2Si_2O_8$, plus small amounts of $Al_2TiO_5$.

4. A glass-ceramic consisting essentially of a fired glass composition, said glass composition consisting essentially of:

| | Percent by weight |
|---|---|
| $SiO_2$ | 30 |
| PbO | 32 |
| $Al_2O_3$ | 11 |
| $TiO_2$ | 9 |
| BaO | 8 |
| ZnO | 10 | and said glass-ceramic containing a total crystalline phase which is from about 20% to about 40% by weight of the glass-ceramic, the crystalline phase being a feldspar of cubic symmetry with the formula $BaAl_2Si_2O$, plus small amounts of $Al_2TiO_5$.

References Cited

UNITED STATES PATENTS

| | | | |
|---|---|---|---|
| 2,220,765 | 11/1940 | Hirose et al. | 106—53 |
| 2,920,971 | 1/1960 | Stookey | 106—39 |
| 2,965,509 | 12/1960 | Hoffman | 106—49 |
| 3,084,053 | 4/1963 | Arlett et al. | 106—39 |
| 3,084,129 | 4/1963 | Hoffman | 106—49X |
| 3,195,030 | 7/1965 | Herczog et al. | 106—39X |
| 3,437,892 | 4/1969 | Hoffman | 106—53X |

OTHER REFERENCES

Levin et al.: Phase Diagrams for Ceramists, Columbus, Ohio, American Ceramic Society (1956), p. 103.

HELEN M. McCARTHY, Primary Examiner

U.S. Cl. X.R.

65—33; 106—52, 53; 252—514; 317—2587

PO-1050
(5/69)

UNITED STATES PATENT OFFICE
CERTIFICATE OF CORRECTION

Patent No. 3,586,522      Dated June 22, 1971

Inventor(s) Lewis C. Hoffman

It is certified that error appears in the above-identified patent and that said Letters Patent are hereby corrected as shown below:

At column 12, line 19, change "$BaAl_2Si_2O$" to -- $BaAl_2Si_2O_8$ --.

Signed and sealed this 28th day of December 1971.

(SEAL)
Attest:

EDWARD M. FLETCHER, JR.
Attesting Officer

ROBERT GOTTSCHALK
Acting Commissioner of Patents